(12) United States Patent
Yamamoto

(10) Patent No.: US 10,220,912 B2
(45) Date of Patent: Mar. 5, 2019

(54) MOTORCYCLE

(71) Applicant: KAWASAKI JUKOGYO KABUSHIKI KAISHA, Hyogo (JP)

(72) Inventor: Shigeki Yamamoto, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 31 days.

(21) Appl. No.: 15/346,921

(22) Filed: Nov. 9, 2016

(65) Prior Publication Data

US 2017/0183059 A1 Jun. 29, 2017

(30) Foreign Application Priority Data

Dec. 28, 2015 (JP) ................................ 2015-256869

(51) Int. Cl.
| | |
|---|---|
| *B62J 17/00* | (2006.01) |
| *B62M 7/02* | (2006.01) |
| *F01P 3/18* | (2006.01) |
| *F01P 11/10* | (2006.01) |
| *F01P 5/06* | (2006.01) |
| *F01N 13/08* | (2010.01) |

(52) U.S. Cl.
CPC .............. *B62M 7/02* (2013.01); *B62J 17/00* (2013.01); *F01P 3/18* (2013.01); *F01P 5/06* (2013.01); *F01P 11/10* (2013.01); *F01N 13/082* (2013.01); *F01N 2590/04* (2013.01); *F01P 2050/16* (2013.01); *F01P 2060/16* (2013.01)

(58) Field of Classification Search
CPC .... B62M 7/02; B62J 17/00; F01P 3/18; F01P 11/10; F01P 2050/16
See application file for complete search history.

(56) References Cited

U.S. PATENT DOCUMENTS

| | | | | |
|---|---|---|---|---|
| 4,640,341 | A * | 2/1987 | Ozawa ................... | B60K 11/04 123/41.33 |
| 6,851,499 | B2 * | 2/2005 | Yagisawa ............... | B62K 19/46 180/219 |
| 6,971,438 | B2 * | 12/2005 | Oki .......................... | F01P 3/18 123/196 AB |
| 7,028,800 | B2 * | 4/2006 | Yagisawa ................... | B62J 1/12 180/219 |
| 7,987,936 | B2 * | 8/2011 | Yamakura ................. | F01P 11/10 137/354 |
| 8,776,923 | B2 * | 7/2014 | Nakamura ............... | B60H 1/26 180/68.1 |

(Continued)

FOREIGN PATENT DOCUMENTS

JP 2013-136273 7/2013

*Primary Examiner* — Anne Marie M Boehler
*Assistant Examiner* — Michael R Stabley
(74) *Attorney, Agent, or Firm* — Wenderoth, Lind & Ponack, L.L.P.

(57) ABSTRACT

The motorcycle includes an engine, a radiator configured to cool cooling water for the engine, a radiator fan configured to suck and discharge air ahead of the radiator, a fan cover guiding downward the air discharged from the radiator fan, and a side cowl disposed on a side of the radiator, in which the side cowl has a cover side lower end at a lower end of a portion positioned below a portion overlapped with the fan cover in a side view, the cover side lower end being positioned adjacent to a lower end of the fan cover.

8 Claims, 9 Drawing Sheets

(56) References Cited

U.S. PATENT DOCUMENTS

| | | | | |
|---|---|---|---|---|
| 2006/0102400 A1* | 5/2006 | Okuno | ............... | F01P 3/18 180/68.4 |
| 2008/0236783 A1* | 10/2008 | Morita | ............... | B60K 11/04 165/41 |
| 2010/0078242 A1* | 4/2010 | Suzuki | ............... | B60K 11/04 180/68.6 |
| 2013/0168039 A1 | 7/2013 | Arai et al. | | |

\* cited by examiner

MOTORCYCLE

BACKGROUND OF THE INVENTION

1. Field of the Invention

The present invention relates to a motorcycle including a radiator configured to cool cooling water for an engine.

2. Description of the Related Art

JP 2013-136273 A discloses a technique on a motorcycle including a radiator configured to cool cooling water for an engine. Air sucked from ahead of the radiator and discharged by a radiator fan is guided downward and discharged by a fan cover positioned behind the radiator.

A motorcycle is sometimes desired to have further improved dischargeability of hot air to outside the vehicle.

SUMMARY OF THE INVENTION

In view of this, an object of the present invention is to provide a motorcycle configured to improve dischargeability of hot air to outside the vehicle.

The present invention provides a motorcycle including:
an engine;
a radiator configured to cool cooling water for the engine;
a radiator fan configured to suck and discharge air ahead of the radiator;
a fan cover guiding downward the air discharged from the radiator fan; and
a side cowl disposed on a side of the radiator; in which
the side cowl has a cover side lower end at a lower end of a portion positioned below a portion overlapped with the fan cover in a side view, the cover side lower end being positioned adjacent to a lower end of the fan cover.

In this configuration, the hot air guided downward by the radiator fan soon reaches the lower end of the side cowl. The hot air having reached the lower end of the side cowl proceeds downward beyond the lower end of the side cowl, so that part of the hot air easily moves outward in a vehicle width direction beyond the side cowl. Such promoted outward movement of the hot air in the vehicle width direction will improve discharge ability of the hot air to outside the vehicle.

The present invention is preferred to further have any of the following configurations.

(1) The motorcycle further includes:
an exhaust pipe connected to an exhaust port of the engine, extending forward from the exhaust port, and turning backward at a front end; in which
the side cowl is disposed with a vertical gap from at least part of the exhaust pipe.

(2) In the configuration (1), the cover side lower end has a rear end edge slanting upward toward a rear end thereof,
the side cowl has a lower end positioned above the front end of the exhaust pipe, and
the exhaust pipe extends forward from the exhaust port along the rear end edge to reach the front end.

(3) The side cowl and the exhaust port of the engine form an open space opened to both sides in a vehicle width direction.

(4) In the configuration (3), the motorcycle further includes an engine cover provided below the open space and covering the engine.

(5) In the configuration (1), the exhaust pipe partially protrudes outward in a vehicle width direction from an extension plane anteroposteriorly extending from an anteroposterior end of the side cowl.

(6) The motorcycle has an opening allowing communication between a space behind the radiator and an outer space in the vehicle width direction of the motorcycle.

In the configuration (1), the side cowl is disposed with the vertical gap from the exhaust pipe, so that the hot air diffuses outward from the vehicle before reaching the upper surface of the exhaust pipe. This prevents the hot air from being heated by the exhaust pipe.

In the configuration (2), the exhaust pipe extends forward from the exhaust port along the rear end edge. The side cowl and the exhaust pipe thus form the vertical gap in a wide range to further improve hot air dischargeability.

In the configuration (3), the open space opened to the both sides in the vehicle width direction is formed between the side cowl and the exhaust port of the engine. Air guided to be discharged by the fan cover can quickly diffuse laterally from the lower end of the side cowl. This further improves hot air dischargeability.

The lower end of the side cowl is positioned above the engine for improvement in hot air dischargeability. In the configuration (4), the engine cover is provided to cover the engine while the side cowl fails to cover the engine. Heat from the engine is thus unlikely to reach a driver for suppression in driver's uncomfort caused by heat of the engine. This configuration also prevents exposure of the engine.

In the configuration (5), the exhaust pipe partially protrudes outward in the vehicle width direction from the extension plane of the side cowl, to allow the exhaust pipe to easily expand outward in the vehicle width direction. This configuration secures length of the exhaust pipe as well as reduces an amount of forward protrusion from the exhaust port of the engine. By reducing the amount of forward protrusion of the exhaust pipe from the exhaust port, the hot air guided downward by the fan cover is prevented from being disturbed by the exhaust pipe.

The fan cover is provided behind the radiator in the configuration (6). Although air is unlikely to pass in the anteroposterior direction of the radiator, the opening is provided to allow air to diffuse outward in the vehicle width direction from behind the radiator through the opening.

In summary, the present invention provides a motorcycle configured to improve dischargeability of hot air to outside the vehicle.

BRIEF DESCRIPTION OF THE DRAWINGS

FIG. 5 is a rear perspective view of the radiator and the like;

DETAILED DESCRIPTION OF THE INVENTION

Figure 1:
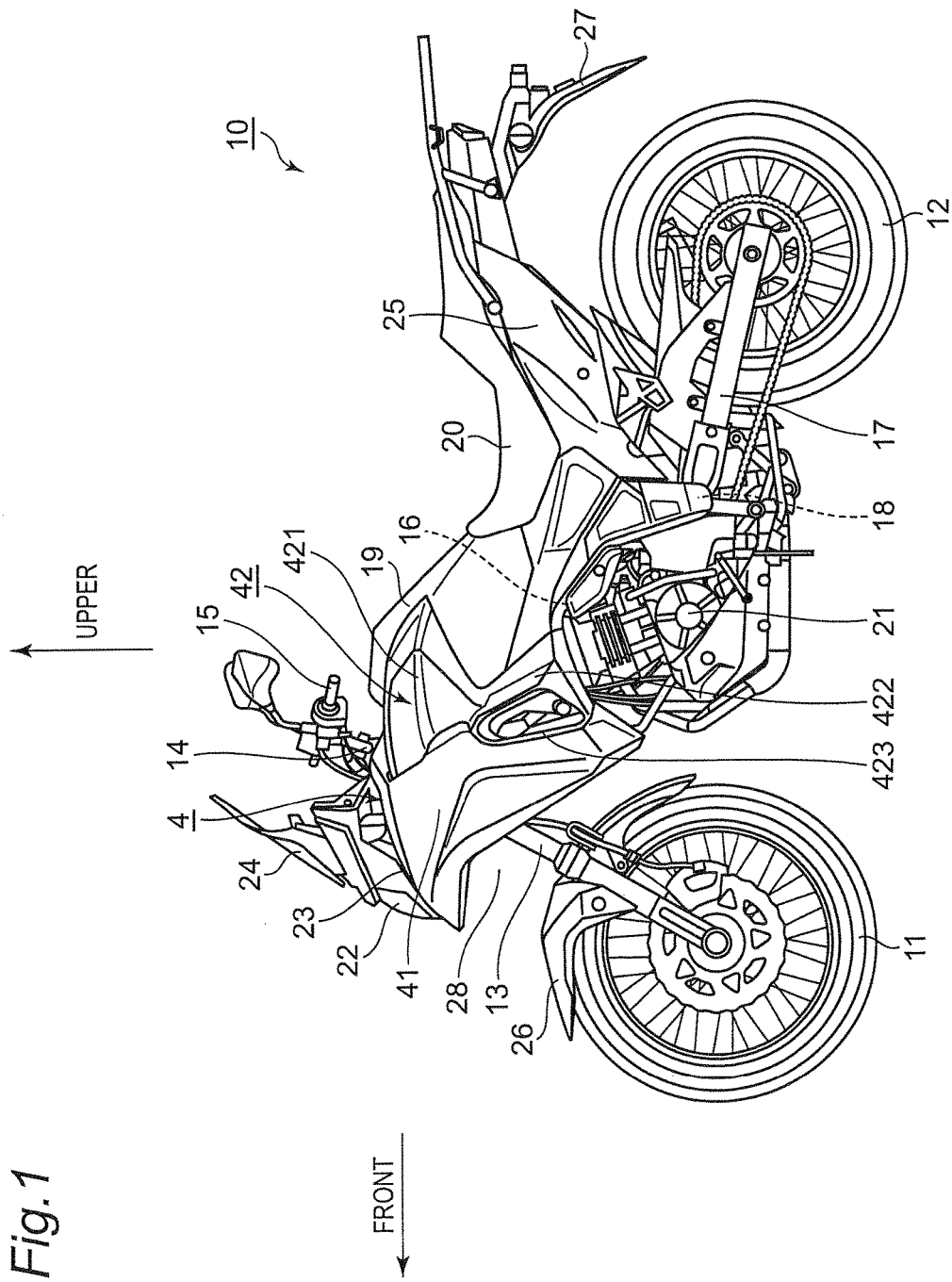
FIG. 1 is a left side view of a motorcycle according to an embodiment of the present invention.

FIG. 1 is a left side view of a motorcycle 10 according to an embodiment of the present invention. Assume that directions referred to in the present embodiment conceptually agree to directions viewed from a driver of the motorcycle 10.

(Entire Configuration)

As depicted in FIG. 1, the motorcycle 10 includes a front wheel 11 and a rear wheel 12. The front wheel 11 is rotatably supported at a lower portion of a front fork 13 extending substantially vertically. The front fork 13 is supported by a steering shaft (not depicted) via an upper bracket 14 provided at an upper end of the front fork 13 and an under bracket provided below the upper bracket 14. The steering shaft is rotatably supported by a head pipe. Attached to the upper bracket 14 is a steering wheel 15 extending leftward and rightward and having a bar shape. When a driver swings the steering wheel 15 leftward or rightward, the front wheel 11 is steered about the steering shaft serving as a rotation axis.

A main frame 16 extends backward and downward from the head pipe, and has a rear portion supporting a front end of a swing arm 17 with a pivot bolt 18. The swing arm 17 has a rear end rotatably supporting the rear wheel 12.

A fuel tank 19 is disposed above the main frame 16 and behind the steering wheel 15. The fuel tank 19 is provided therebehind with a driver's seat 20. The fuel tank 19 is provided therebelow with an engine 21. Power of the engine 21 is transmitted to the rear wheel 12 by way of a chain and the like.

The steering wheel 15 is provided thereahead with a head lamp 22 that is covered with a front cowl 23. The front cowl 23 is provided thereon with a windshield 24 mitigating wind pressure to a driver.

(Engine and Exhaust Pipe)

Figure 2:
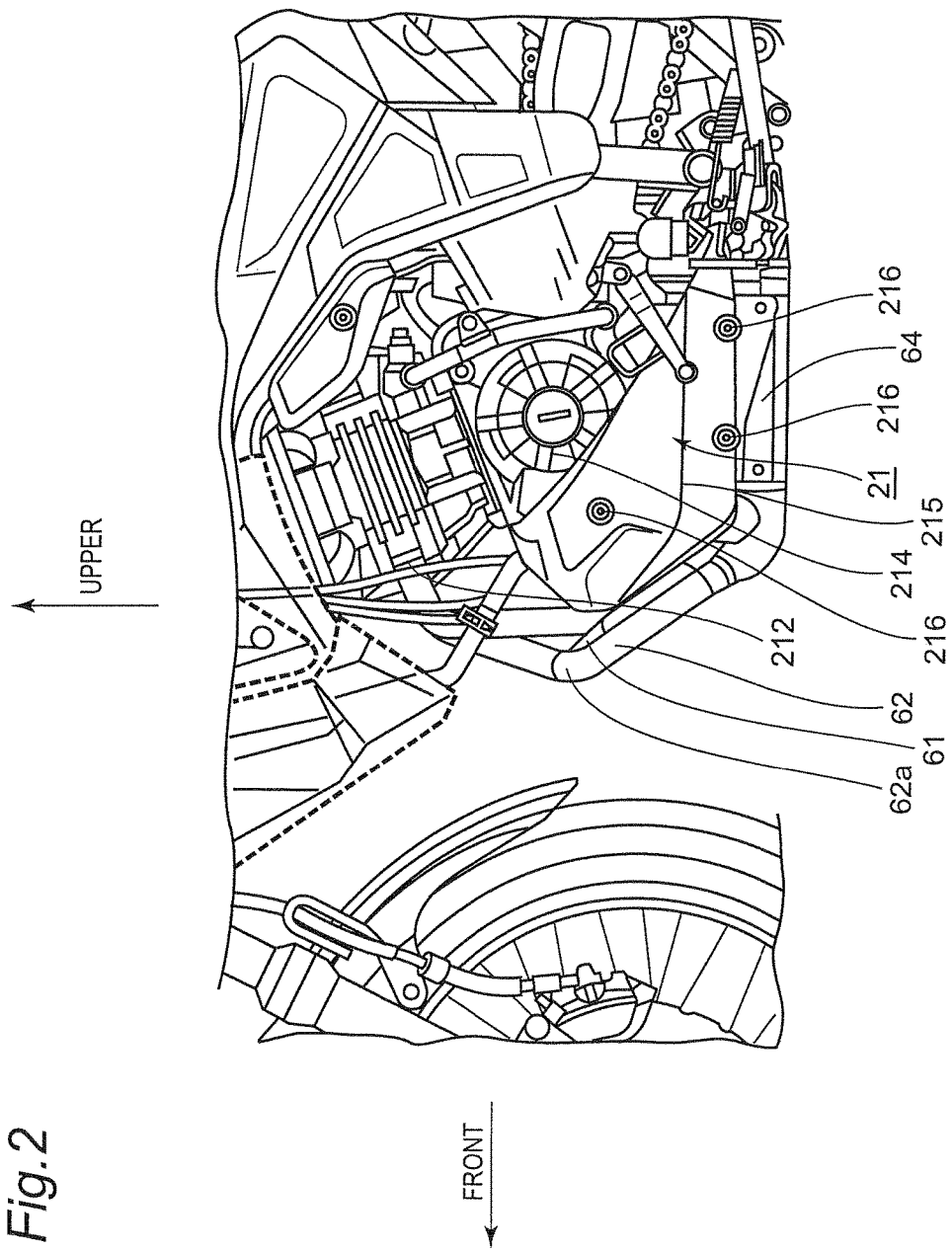
FIG. 2 is an enlarged side view of an engine portion.
Figure 3:
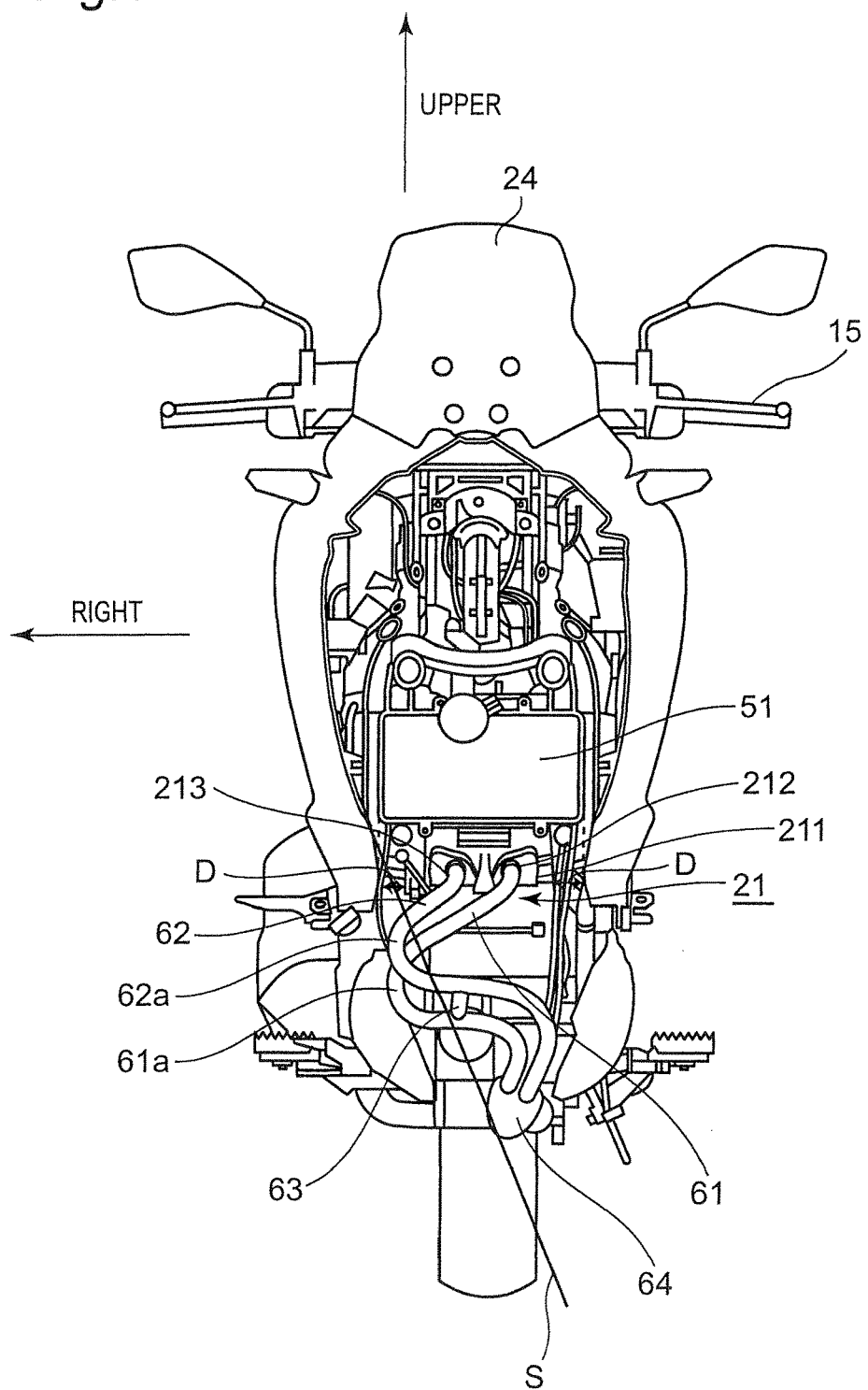
FIG. 3 is a front view of the motorcycle from which a front cowl is removed.

FIG. 2 is an enlarged side view of the portion of the engine 21, and FIG. 3 is a front view of the motorcycle 10 from which the front cowl 23 is removed. FIG. 3 depicts the portion in cross section, from which the front cowl 23 is removed. The engine 21 includes a cylinder 211 slanting downward toward a front end thereof. There are provided two cylinders in the present embodiment, and the cylinders 211 each have a front wall provided with a first exhaust port 212 and a second exhaust port 213. The first exhaust port 212 is connected with a first exhaust pipe 61 whereas the second exhaust port 213 is connected with a second exhaust pipe 62. The first exhaust port 212 connected with the first exhaust pipe 61 is positioned on the left side of the second exhaust port 213 connected with the second exhaust pipe 62. The first exhaust pipe 61 and the second exhaust pipe 62 extend either leftward or rightward, i.e. rightward and forward in the present embodiment, from the first exhaust port 212 and the second exhaust port 213, and turn leftward and backward at a front end 61a and a front end 62a positioned ahead of the engine 21, respectively. The front end 61a and the front end 62a are positioned substantially identically in the vehicle width direction in a front view, and the front end 62a is positioned above the front end 61a.

The first and second exhaust pipes 61 and 62 turn leftward and backward at the front ends 61a and 62a, respectively, and are then coupled by a coupling member 63 around a position ahead of a crankcase 214 of the engine 21. The first and second exhaust pipes 61 and 62 further extend leftward and backward as well as downward along the crankcase 214, and are collected by a collecting pipe 64 positioned on the left side of and below the crankcase 214. The collecting pipe 64 is positioned on the left side of and below crankcase 214, and extends backward along the crankcase 214 to reach an exhaust muffler. The first exhaust pipe 61 is connected to the collecting pipe 64 at a position on the right side of a position where the second exhaust pipe 62 is connected to the collecting pipe 64.

Attached to the crankcase 214 of the engine 21 by boss bores of the crankcase 214 and bolts 216 is an engine cover 215 covering a front portion and a lower half of the crankcase 214. The crankcase 214 is provided, on the left and right sides thereof, with a pair of engine covers 215 covering constituent parts of the engine such as an oil pressure switch, an exhaust gas sensor, and an oil filter. The engine covers 215 protect the constituent parts of the engine from collision with foreign matter like pebbles raised by the front wheel 11, an oncoming vehicle, or the like.

(Radiator, Radiator Fan, and Fan Cover)

Figure 4:
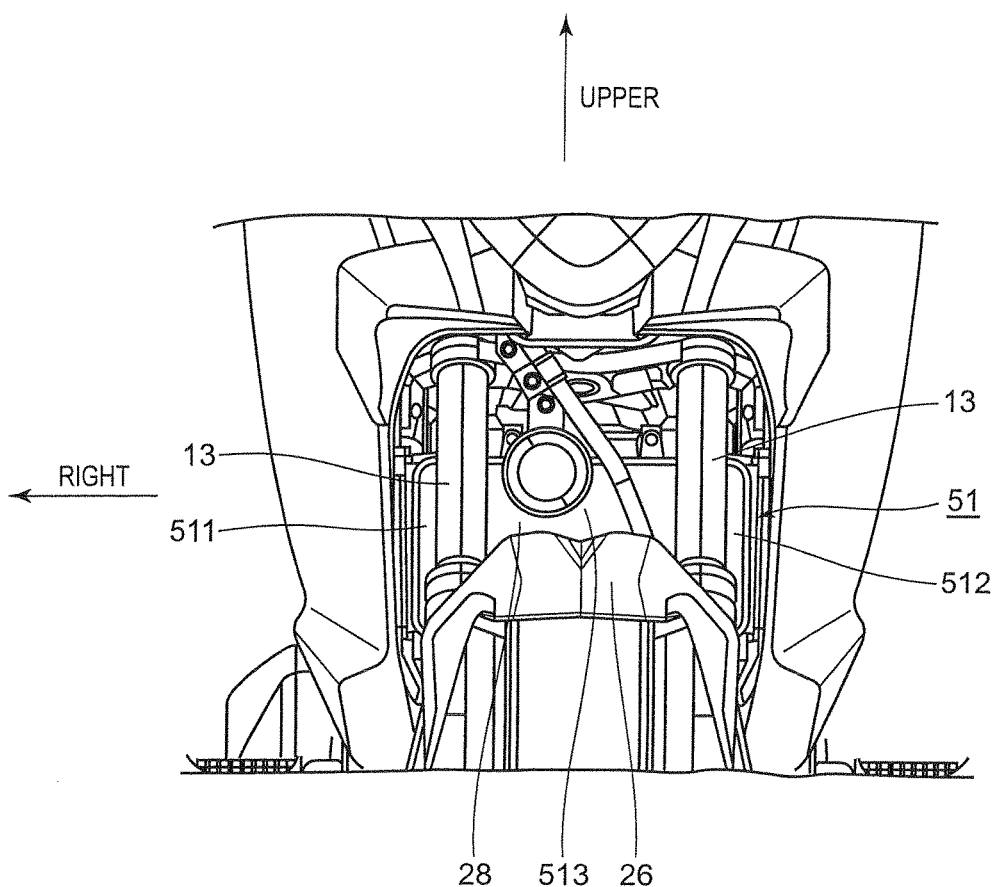
FIG. 4 is a front view of a radiator and the vicinity thereof.
Figure 5:
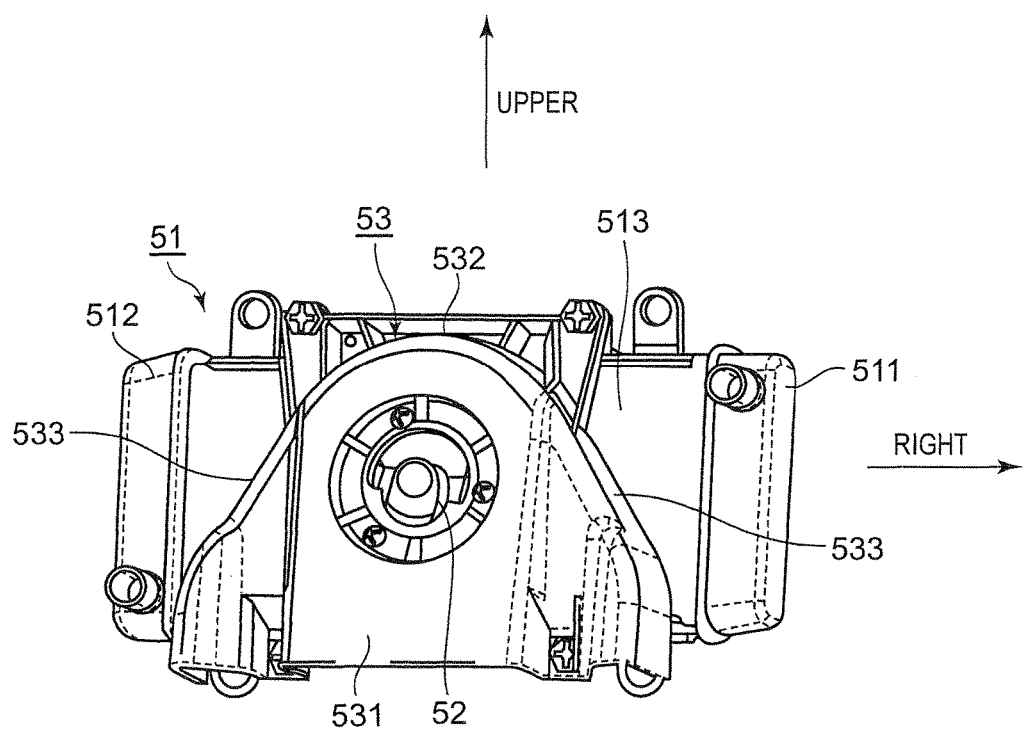

The engine 21 is of a water cooling type and cooling water is cooled by a radiator 51 disposed above and ahead of the engine 21. FIG. 4 is a front view of the radiator and the vicinity thereof, and FIG. 5 is a rear perspective view of the radiator 51 and the like. As depicted in FIGS. 4 and 5, the radiator 51 has a laterally long rectangular shape in a front view, and is provided at a right end thereof with a cooling water inlet tank 511 and is provided at a left end thereof with a cooling water outlet tank 512. The radiator 51 is of a crossflow type provided with a core 513 between the inlet tank 511 and the outlet tank 512. The inlet tank 511 is configured to receive cooling water of relatively high temperature discharged from a cylinder head of the engine 21 and to guide the cooling water to the core 513. In contrast, the outlet tank 512 is configured to collect cooling water having passed through the core 513 and lowered in temperature and to export the cooling water to the engine 21. The core 513 is provided with tubes extending leftward and rightward and aligned vertically. The tubes adjacent to each other are provided therebetween with fins turning repeatedly, so that cooling water flowing in the tubes exchanges heat with wind blowing through the core.

The radiator 51 is provided therebehind with an electromotive radiator fan 52 configured to forcibly suck hot wind from the radiator 51 in a case where blowing wind is weak during low-speed travel, for example. For example, the radiator fan 52 is of an axial flow type including an impeller rotated by a thin electric motor to be configured to suck out wind in an axial direction of the impeller. The impeller of the radiator fan is not limited to the axial flow type and may be alternatively of a centrifugal type or the like.

Provided behind the radiator fan 52 is a fan cover 53 covering a rear end of the radiator fan 52, covering continuously from an upper end to left and right ends of the radiator fan 52, and opening only a lower end. The fan cover 53 includes a rear wall 531 entirely having a triangular shape and covering the rear end of the radiator fan 52, an upper wall 532 curving into an arc shape to extend forward from an upper edge of the rear wall 531 and surrounding an upper periphery of the radiator fan, and a pair of left and right side walls 533 extending downward while expanding leftward and rightward from left and right ends of the upper wall 532, respectively.

The fan cover 53 also entirely has a triangular shape and the pair of left and right side walls 533 expands in the vehicle width direction toward the lower ends. A flow channel downwardly guiding hot wind from the radiator fan 52 has a sectional area expanding in the vehicle width direction toward a lower end thereof. The fan cover 53 has an anteroposterior dimension also gradually increasing toward the lower end, and the sectional area of the flow channel for hot wind expands also anteroposteriorly toward the lower end. The lower portions of the left and right side walls 533 gently curve inward and then extend substantially vertically to cause hot wind to blow out downward. The fan cover 53 is made from resin, and the rear wall 531, the upper wall 532, and the left and right side walls 533 are formed integrally.

The radiator 51 and the fan cover 53 are disposed along the cylinders 211 (slanting downward toward the front ends) of the engine 21. Specifically, the radiator 51 and the fan cover 53 are disposed in parallel with axes of the cylinders 211 in a side view.

As depicted in FIG. 3, the radiator 51 is longer in the vehicle width direction than the engine 21, and there is provided a gap D between an outer side surface in the vehicle width direction of the radiator 51 and an outer side surface in the vehicle width direction of the engine 21. The fan cover 53 has an outer side surface in the vehicle width direction positioned outside in the vehicle width direction with respect to the outer side surface in the vehicle width direction of the engine 21.

(Front Cowl, Side Cowl, and Side Cover)

As depicted in FIG. 1, the motorcycle 10 is provided with a vehicle cover covering the vehicle body. The vehicle cover includes the front cowl 23 covering the front portion of the vehicle and a pair of left and right side cowls 4 covering side portions of the vehicle, and a pair of left and right rear cowls 25 covering a rear portion of the vehicle. These cowls are each made from synthetic resin or the like. A front fender 26 covering the front wheel 11 is attached to the front fork 13, and a rear fender 27 covering the rear wheel 12 is attached to the rear cowls 25. The front cowl 23 and the side cowls 4 cover the head lamp 22 as well as front and side surfaces of an upper front portion of the vehicle.

The front cowl 23 covers the center of the upper front portion of the vehicle, and is fixed, ahead of the head pipe to a vehicle frame via a cowl stay. The front cowl 23 has a triangular shape in a top view, expanding backward from the front end in the vehicle width direction. There is provided, between the lower end of the front cowl 23 and the front fender 26, an intake open space 28 for receiving intake air to the engine 21. Wind blows from the intake open space 28 to an air cleaner via an intake passage, and air cleaned by the air cleaner is supplied to the engine 21. As depicted particularly in FIG. 4, the upper end of the front fender 26 is positioned at a vertically intermediate portion of the radiator 51.

The side cowls 4 extend backward and downward from the rear left and rear right ends of the front cowl 23 while expanding outward in the vehicle width direction to have bilaterally symmetrical shapes. The side cowls 4 each include a side cowl body 41 connected to the rear end of the front cowl 23 and a side cover 42 connected to a rear end of the side cowl body 41. The side cowls 4 extend at least from ahead of the radiator 51 to behind the fan cover 53 in the anteroposterior direction.

(Shape of Side Cowl Body)

Figure 6:
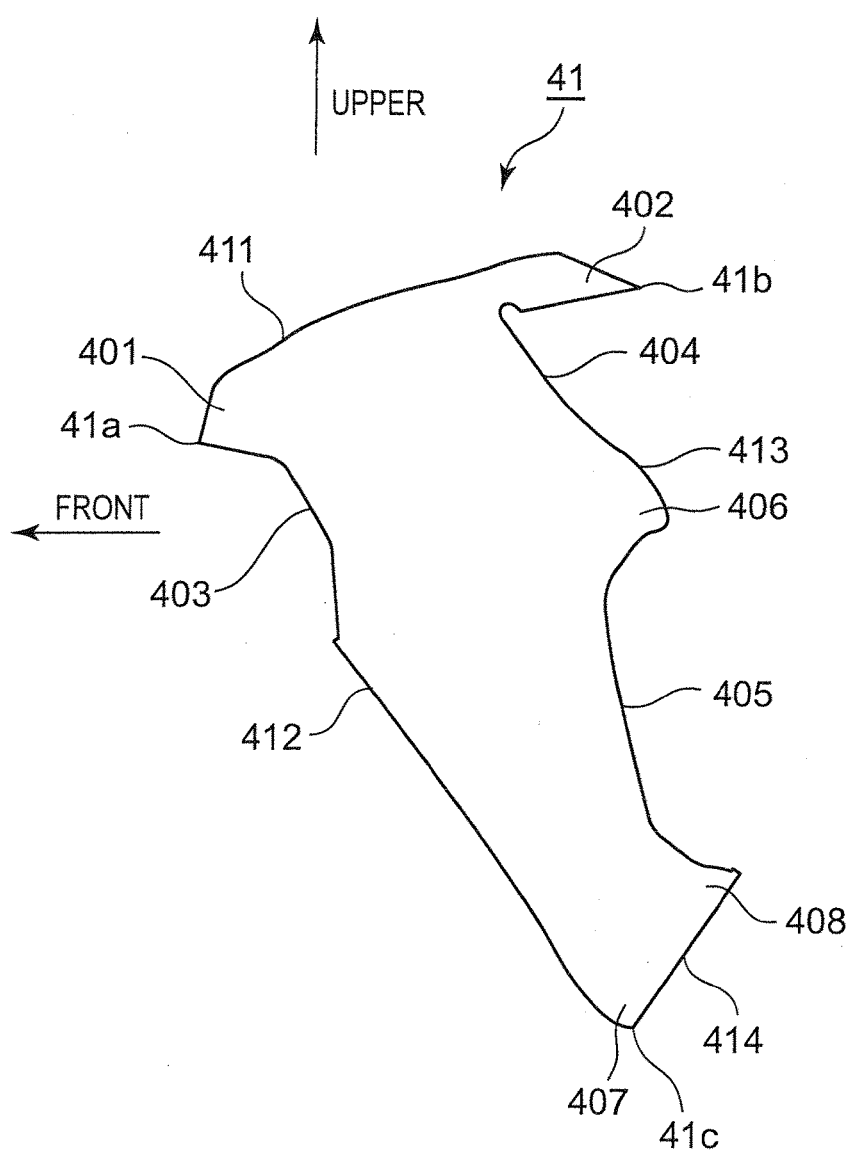
FIG. 6 is an external view of a left side cowl body.
Figure 7:
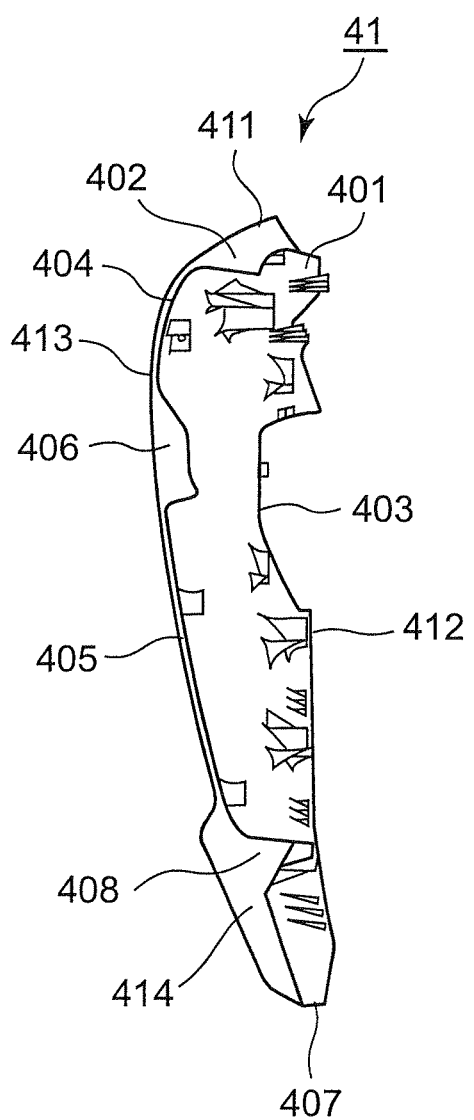
FIG. 7 is a rear perspective view of the left side cowl body.

FIG. 6 is an external view of the left side cowl body 41, and FIG. 7 is a rear perspective view of the left side cowl body 41. The side cowl bodies 41 are paired to have bilaterally symmetrical shapes. The left side cowl body 41 will be exemplarily described below.

As depicted in FIGS. 6 and 7, the side cowl body 41 entirely has a curving shape and protrudes most in the vehicle width direction at a position adjacent to the rear portion. In a side view, the side cowl body 41 includes a first surface 411 slanting upward from an upper front end as a peak to a rear end, a second surface 412 slanting downward from the peak to a rear end, a third surface 413 provided with the side cover 42, and a fourth surface 414 coupling a lower end of the second surface 412 and a lower end of the third surface 413. The side cowl body 41 has a substantially triangular shape in a side view. Specifically, the side cowl body 41 has a substantially triangular shape connecting a front end point 41a, an upper end point 41b positioned above and behind the front end point 41a, and a lower end point 41c positioned below and behind the front end point 41a. The front end point 41a and the upper end point 41b have a vertical distance shorter than a vertical distance between the front end point 41a and the lower end point 41c. The side cowl body 41 extends at least from ahead of the radiator 51 to behind the radiator 51 in the anteroposterior direction.

As depicted in FIG. 3, an extension plane S extending forward from the front end of the side cowl body 41 is directed inward in the vehicle width direction toward a front end. The extension plane S extends from an inner wall surface or an outer wall surface of the side cowl body 41. In a case where the inner wall surface and the outer wall surface curve in different manners, the extension plane S preferably extends from one of the wall surfaces positioned inside in the vehicle width direction. A portion adjacent to the front end 61a of the first exhaust pipe 61 and a portion adjacent to the front end 62a of the second exhaust pipe 62 protrude outward in the vehicle width direction from the extension plane S. The front end 61a of the first exhaust pipe 61 and the front end 62a of the second exhaust pipe 62 are positioned substantially at the right end of the radiator 51 in the vehicle width direction.

The front end of the first surface 411 and the upper end of the second surface 412 are coupled at a coupling portion 401 that protrudes forward in a side view and protrudes inward in the vehicle width direction. The rear end of the first surface 411 and the upper end of the third surface 413 are coupled at a coupling portion 402 that protrudes backward in a side view and protrudes inward in the vehicle width direction. The second surface 412 is provided, at a top thereof, with a recess 403 recessed backward in a side view for connection to the front cowl 23. The third surface 413 is provided with recesses 404 and 405 recessed forward in a side view and aligned vertically for connection to the side cover 42. There is provided, between the recess 404 and the recess 405, a protrusion 406 extending inward in the vehicle width direction.

In the side cowl body 41, the lower end of the second surface 412 is positioned at the lowest level and the fourth surface 414 slants upward from the lower end of the second surface 412 toward the rear end. The side cowl body 41 has a lower end surface in a V shape in a side view. The second surface 412 has a lower end 407 corresponding to the lowest point in the V shape. The lower end 407 corresponds to the lowest end of the entire side cowl body 41. The lower end 407 is positioned ahead of the fan cover 53 and above a driver's footstep. The radiator 51 has a cooling hose extending downward from a position adjacent to the lower end 407. The fourth surface 414 entirely curves inward in the vehicle width direction and has a rear end 408 inwardly protruding most in the vehicle width direction. The fourth surface 414 extends from the lower end 407 toward the cylinder head of the engine 21, and the first exhaust port 212 and the second exhaust port 213 are exposed in a side view.

The radiator 51 has a cooling hose 51a partially exposed from the side cowl body 41. The side cowl body 41 is shaped to partially expose the cooling hose 51a. Specifically, the lower end of the side cowl body 41 is positioned above a lower end of the cooling hose 51a.

(Shape of Side Cover)

Figure 8:
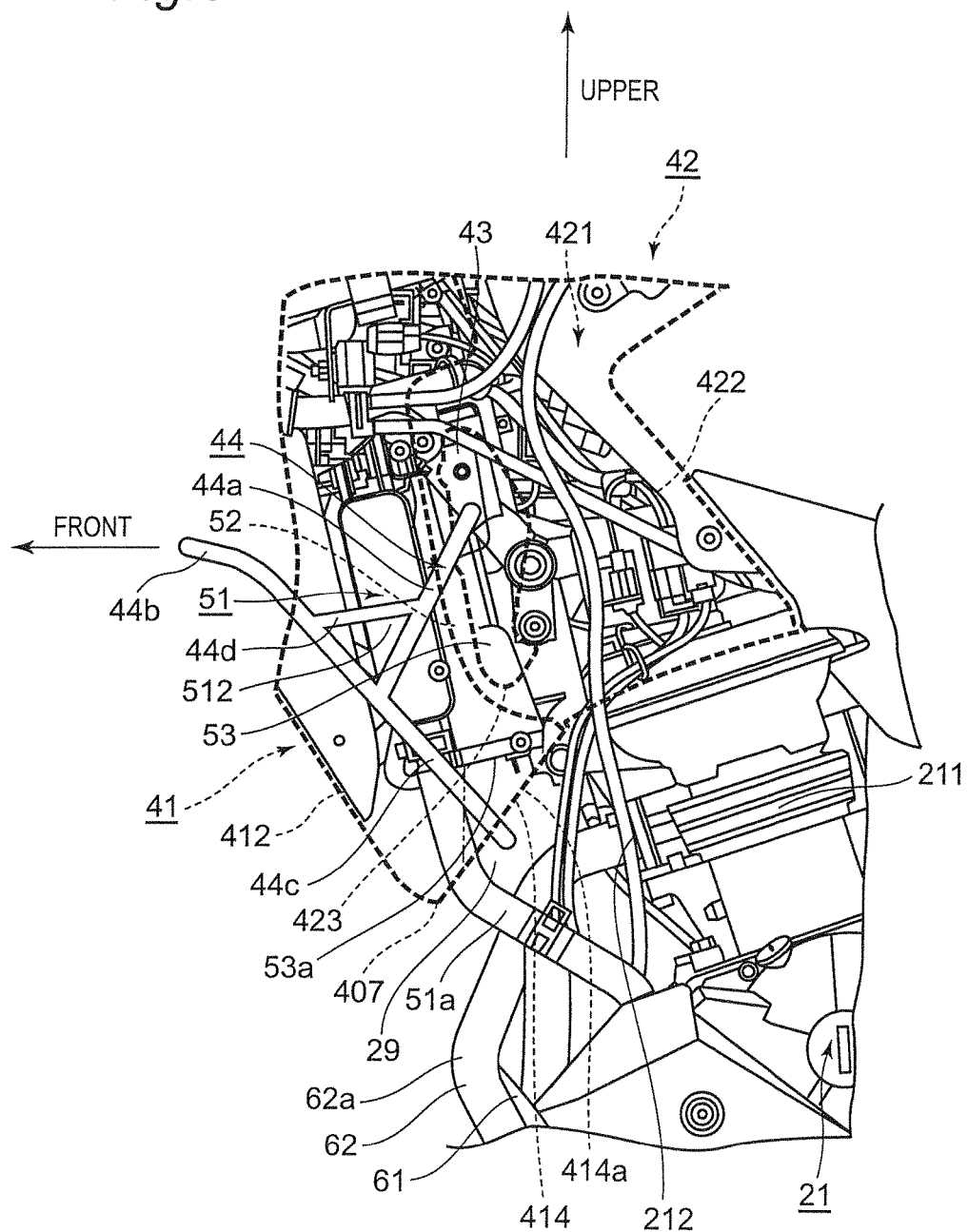
FIG. 8 is a side view of the radiator and the vicinity thereof with a side cover being attached.
Figure 9:
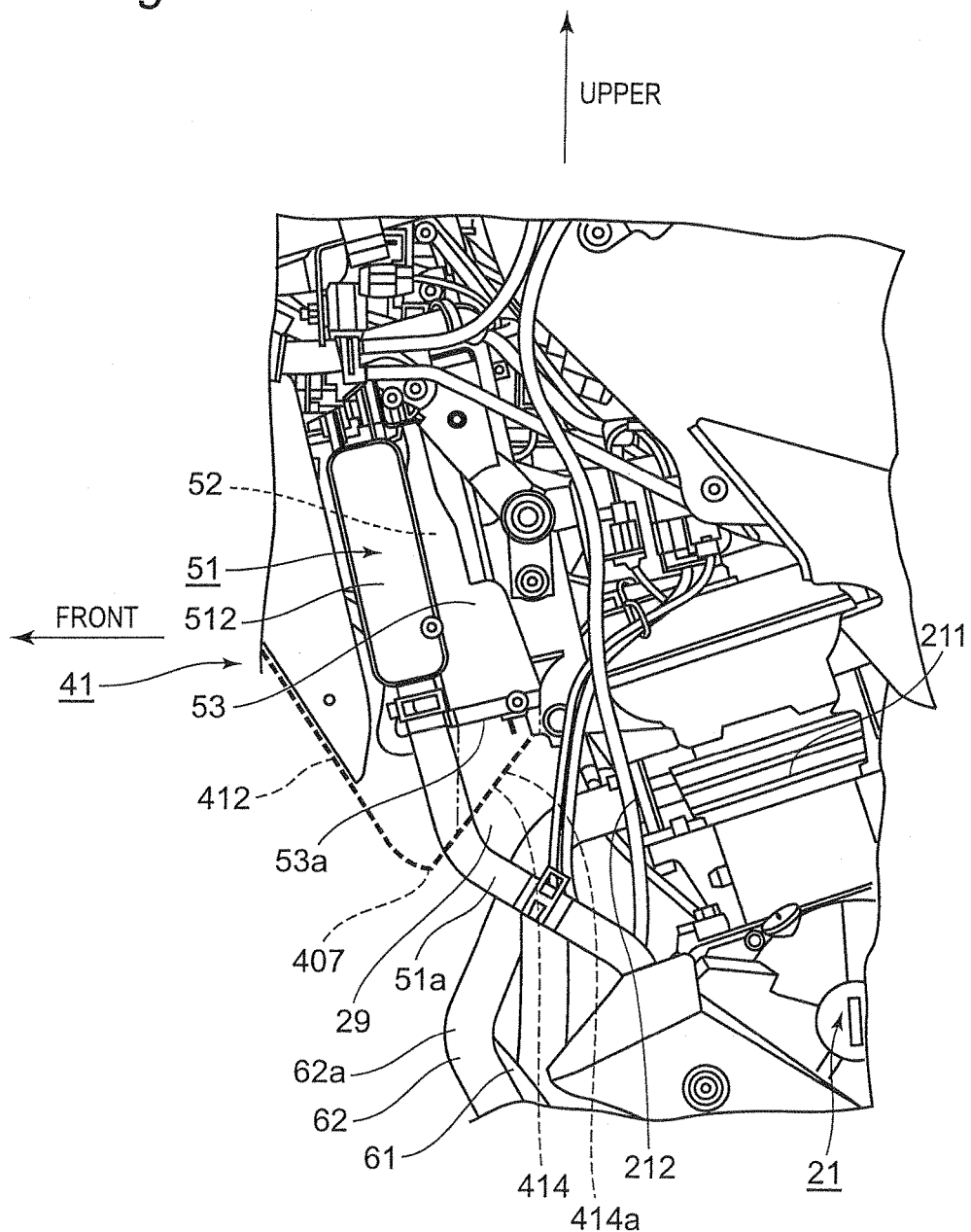
FIG. 9 is a side view similar to FIG. 8, with the side cover being removed.

The side covers 42 are paired to have bilaterally symmetrical shapes. The left side cover 42 will be exemplarily described below. FIG. 8 is a side view of the radiator 51 and the vicinity thereof with the side cover 42 being attached, whereas FIG. 9 is a side view similar to FIG. 8, with the side cover 42 being removed. As depicted in FIGS. 1, 8, and 9, the side cover 42 includes a cover upper portion 421 covering a front portion of the fuel tank 19, and a cover lower portion 422 covering the upper ends of the cylinders of the engine 21 and the rear end of the fan cover 53. The cover upper portion 421 and the cover lower portion 422 are formed integrally with each other. In a side view, the cover upper portion 421 has an inverted triangular shape and the cover lower portion 422 has a triangular shape. A coupling portion between the cover upper portion 421 and the cover lower portion 422 is the smallest in a side view. The cover upper portion 421 is coupled to the recess 404 of the third surface 413 of the side cowl body 41, whereas the cover lower portion 422 is coupled to the recess 405 of the third surface 413 of the side cowl body 41. The cover lower portion 422 has a lower end surface slanting upward toward a rear end thereof. The side cowl body 41 and the side cover 42 slant upward from the lower end 407 of the side cowl body 41 to the rear ends.

The cover lower portion 422 is provided with an opening 423 penetrating in the vehicle width direction. The cover lower portion 422 has a front portion protruding outward in the vehicle width direction from a rear portion. The opening 423 is provided substantially entirely across a lateral end surface of the front portion. The opening 423 is overlapped with the rear end of the fan cover 53 in a side view. The opening 423 has a vertically long shape with vertical length longer than anteroposterior length. The opening 423 is positioned ahead of the first exhaust port 212 and the second exhaust port 213 of the engine 21.

The opening 423 has an edge provided with a pair of left and right guard stays 43 to each of which a guard member 44 is attached. The guard member 44 includes a first portion 44a protruding outward in the vehicle width direction from the opening 423 and extending forward and downward, a second portion 44b branched from a distal end of the first portion 44a and extending forward and upward, a third portion 44c branched from the distal end and extending backward and downward, and a fourth portion 44d coupling the first portion 44a and the second portion 44b. The guard member 44 is positioned on a side of the side cowl body 41 and protects the side cowl body 41 from collision with foreign matter like pebbles raised by the front wheel 11, an oncoming vehicle, or the like.

(Positional Relation Among Side Cowl Body, Side Cover, Exhaust Pipe, etc.)

The side cowl body 41 has a cover side lower end 414a at a lower end of a portion positioned below a portion overlapped with the fan cover 53 in a side view. The cover side lower end 414a is part of the fourth surface 414 of the side cowl body 41 and is positioned adjacent to a lower end 53a of the fan cover 53. As described above, the fourth surface 414 slants upward toward the rear end. Specifically, the rear end 408 is positioned substantially identically with the lower end 53a of the fan cover 53. The cover side lower end 414a thus has a rear end edge slanting upward toward a rear end thereof. The cover side lower end 414a in the side cowl body 41 has only to be at least partially as substantially high as the lower end 53a of the fan cover 53. The cover side lower end 414a can partially be disposed above and/or below the lower end 53a of the fan cover 53. The cover side lower end 414a according to the present embodiment is positioned below the lower end 53a of the fan cover 53.

The fourth surface 414 of the side cowl body 41 is positioned above the front ends 61a and 62a of the first and second exhaust pipes 61 and 62. The first and second exhaust pipes 61 and 62 extend forward from the first and second exhaust ports 212 and 213 along the fourth surface 414 to reach the front ends 61a and 62a, respectively. The lower end 407 of the side cowl body 41 is positioned below the lower end 53a of the fan cover 53 and above the front ends 61a and 62a of the first and second exhaust pipes 61 and 62. The first and second exhaust ports 212 and 213 are each positioned behind the fourth surface 414 and at a substantially vertically intermediate position on the fourth surface 414.

An open space 29 having a vertical gap and opened to the both sides in the vehicle width direction is provided between the fourth surface 414 of the side cowl body 41 and the first and second exhaust pipes 61 and 62 extending from the first and second exhaust ports 212 and 213 to the front ends 61a and 62a of the first and second exhaust pipes 61 and 62. The open space 29 has the vertical gap not less than the thickness of the first and second exhaust pipes 61 and 62 slanting upward toward a rear end thereof in a side view. The lower end 407 and the front ends 61a and 62a of the first and second exhaust pipes 61 and 62 are positioned substantially identically in the anteroposterior direction in a side view to form a front end of the open space 29. The front end has the widest vertical gap in the open space 29.

The motorcycle 10 configured as described above exerts the following effects.

(1) In the side cowl body 41, the cover side lower end 414a at the lower end of the portion positioned below the portion overlapped with the fan cover 53 in a side view is positioned adjacent to the lower end 53a of the fan cover 53. Hot air guided downward by the radiator fan 52 soon reaches the lower end of the side cowl body 41. The hot air having reached the lower end of the side cowl body 41 proceeds downward beyond the lower end of the side cowl body 41, so that part of the hot air easily moves outward in the vehicle width direction beyond the side cowl body 41. Such promoted outward movement of the hot air in the vehicle width direction will improve dischargeability of the hot air to outside the vehicle. Hot exhaust air from the fan cover 53 is thus inhibited from staying in the side cowl body 41. This configuration inhibits increase in temperature in the side cowl body 41.

(2) The side cowl body 41 is disposed with the vertical gap from the first and second exhaust pipes 61 and 62, so that hot air diffuses outward from the vehicle before reaching the upper surfaces of the first and second exhaust pipes 61 and 62. This prevents the first and second exhaust pipes 61 and 62 from heating hot air.

(3) The first and second exhaust pipes 61 and 62 extend forward from the first and second exhaust ports 212 and 213 along the rear end edge. The side cowl body 41 and the first and second exhaust pipes 61 and 62 thus form the vertical gap in a wide range to further improve hot air dischargeability. The first and second exhaust pipes 61 and 62 extend along the rear end edge of the cover side lower end 414a. The space between the first and second exhaust pipes 61 and 62 and the side cowl body 41 thus extends vertically and anteroposteriorly.

(4) The open space 29 opened to the both sides in the vehicle width direction is formed between the side cowl body 41 and the first and second exhaust ports 212 and 213 of the engine 21. Air guided to be discharged by the fan cover 53 can quickly diffuse laterally from the lower end of the side cowl body 41. This further improves hot air dischargeability. Air from the fan cover 53 is thus unlikely to reach a driver for suppression in driver's uncomfort caused by hot air. The entire side cowl body 41 is positioned entirely above the first and second exhaust pipes 61 and 62, so that the open space 29 is enlarged for improvement in hot air dischargeability.

(5) The lower end of the side cowl body 41 is positioned above the engine for improvement in hot air dischargeability. The engine cover 215 is provided to cover the engine 21 while the side cowl body 41 fails to cover the engine. Heat from the engine 21 is unlikely to reach a driver for suppression in driver's uncomfort caused by heat of the engine 21. This configuration also prevents exposure of the engine 21.

(6) The portions adjacent to the front ends 61a and 62a as part of the first and second exhaust pipes 61 and 62 protrude outward in the vehicle width direction from the extension plane S of the side cowl body 41, to allow the first and second exhaust pipes 61 and 62 to easily expand outward in the vehicle width direction. This configuration secures length of the first and second exhaust pipes 61 and 62 as well as reduces the amounts of forward protrusion from the first and second exhaust ports 212 and 213 of the engine 21. By reducing the amounts of forward protrusion from the exhaust ports of the first and second exhaust pipes 61 and 62, hot air guided downward by the fan cover 53 is prevented from being disturbed by the first and second exhaust pipes 61 and 62. The first and second exhaust pipes 61 and 62 are disposed to expand in the vehicle width direction while interference with the side cowl body 41 being prevented. The first and second exhaust pipes 61 and 62 are thus made longer and disposed adjacent to the engine 21.

(7) The fan cover 53 is provided behind the radiator 51. Although air is thus unlikely to pass in the anteroposterior direction of the radiator 51, the opening 423 is provided to allow air to diffuse outward in the vehicle width direction from behind the radiator 51 through the opening 423. This configuration inhibits increase in temperature of the radiator 51.

(8) The lower end of the side cowl body 41 is positioned above the front ends 61a and 62a of the first and second exhaust pipes 61 and 62. The first and second exhaust pipes 61 and 62 extend forward from the first and second exhaust ports 212 and 213 along the rear end surface to reach the front ends 61a and 62a, respectively. This configuration prevents interference between the side cowl body 41 and the first and second exhaust pipes 61 and 62. The lower end of the side cowl body 41 is positioned above the front ends 61a and 62a of the first and second exhaust pipes 61 and 62, to enhance disposition flexibility of the first and second exhaust pipes 61 and 62.

(9) The opening 423 has the vertically long shape with the vertical length longer than the anteroposterior length. In comparison to an opening with anteroposterior length longer than vertical length, wind blowing from ahead easily diffuses hot air in the opening 423 outward in the vehicle width direction and backward.

(10) The guard member 44 protecting some of the constituent parts of the engine 21 is attached to the opening 423. The lower end surface of the side cowl body 41 at a portion overlapped with the fan cover 53 is positioned adjacent to the lower end 53a of the fan cover 53 in a side view. While the side cowl body 41 fails to cover the constituent parts of the engine 21, the opening 423 provided in the side cover 42 protects the constituent parts of the engine 21 from collision with foreign matter.

(11) The lower end surface of the side cowl body 41 at the portion overlapped with the fan cover 53 is positioned adjacent to the lower end 53a of the fan cover 53 in a side view. While the side cowl body 41 fails to cover the constituent parts of the engine 21, the engine cover 215 attached to the engine 21 protects the sensor and the like of the engine 21 from collision with foreign matter. The engine cover 215 also improves quality in outer appearance of the engine 21.

(12) The intake open space 28 for receiving intake air to the engine 21 is provided between the lower end of the front cowl 23 and the front fender 26. Wind blowing from ahead of the motorcycle 10 thus easily reaches the radiator 51 through the intake open space 28 for improvement in cooling performance of the radiator 51.

(13) The side cowl body 41 entirely has the curving shape and protrudes most in the vehicle width direction at a position adjacent to the rear portion. This configuration inhibits wind from blowing to driver's legs.

(14) The side cowl body 41 extends at least from ahead of the radiator 51 to behind the radiator 51 in the anteroposterior direction. Blowing wind is thus prevented from being directed outward in the vehicle width direction of the radiator 51 and easily passes through the radiator 51.

(15) The side cowl body 41 and the side cover 42 cover the outer ends in the vehicle width direction of the fan cover 53 to prevent exposure of the fan cover 53 and improve quality in outer appearance of the motorcycle 10.

(16) The side cowl body 41 and the side cover 42 slant upward from the lower end (as the lowermost end) of the second surface 412 of the side cowl body 41 toward the rear ends. The rear ends of the side cowl body 41 and the side cover 42 covering the fan cover 53 are disposed at the highest levels. This configuration promotes diffusion of hot air during low-speed travel.

(17) The cover side lower end 414a is positioned below the lower end 53a of the fan cover 53, to prevent exposure of the fan cover 53 in a side view and improve quality in outer appearance of the motorcycle 10.

(18) The lower end 407 is positioned ahead of the fan cover 53, so that hot air from the fan cover easily diffuses outward in the vehicle width direction before reaching the lower end 407.

(19) The outer side surface in the vehicle width direction of the fan cover 53 is positioned outside in the vehicle width direction from the outer side surface in the vehicle width direction of the engine 21. In a state where hot air guided from the fan cover 53 stays below the side cowl body 41, a gap in the vehicle width direction is easily formed between the outer side surface in the vehicle width direction of the engine 21 and the side cowl body 41 for easier discharge of hot air. Specifically, the present invention is preferably applicable to an engine including less than four cylinders.

(20) The fan cover 53 is configured to guide outward in the vehicle width direction hot air from the radiator fan in a vertical section in the vehicle width direction of the fan cover 53. The side cowl body 41 is preferably positioned above hot air guided by the fan cover 53. This configuration prevents collision of hot air guided by the fan cover 53 with the side cowl body 41 and diffuses hot air more effectively.

In the embodiment described above, the rear end 408 of the fourth surface 414 of the side cowl body 41 is positioned substantially identically with the lower end 53a of the fan cover 53. The position is not limited to the rear end 408 of the side cowl body 41. In the side cowl body 41, the portion covering the fan cover 53 has only to at least partially be substantially as high as the lower end 53a of the fan cover 53. For example, the portion covering the fan cover 53 can partially be disposed above and/or below the lower end 53a of the fan cover 53.

The side cowl body 41 and the side cover 42 are provided separately from each other in the above embodiment. The side cowl body and the side cover may be alternatively provided integrally with each other.

The pair of left and right engine covers 215 covers the front portion and the lower half of the crankcase 214 in the above embodiment. Alternatively, the crankcase 214 may be provided, on the left and right sides, with left and right engine covers having different shapes, or may be provided with only a left or right engine cover. Furthermore, the crankcase 214 can be covered entirely, partially at the rear portion, or partially at the upper half. The engine cover 215 is preferably configured to cover at least the constituent parts of the engine such as the oil pressure switch, the exhaust gas sensor, and the oil filter.

Each of the left and right guard members 44 extends forward and downward from the guard stay 43, is then branched in a forward and upward direction and a backward and downward direction, and is positioned on the side of the side cowl body 41 to protect the side cowl body 41 in the above embodiment. Alternatively, the left and right guard members 44 have different shapes or only one of the left and right guard members may be provided. Still alternatively, the guard member 44 may extend backward and downward from the guard stay 43 and may be positioned on the sides of the cylinders 211, the cylinder head, and the like in the upper portion of the engine 21 to protect these constituent parts of the engine 21.

The side cowl body 41 is positioned entirely above the first and second exhaust pipes 61 and 62 in the above embodiment. The side cowl body 41 positioned partially above the first and second exhaust pipes 61 and 62 is also included in the scope of the present invention.

The engine 21 according to the above embodiment includes two cylinders. The number of the cylinders is not limited to two, and the engine 21 can be a single cylinder engine or a multiple cylinder engine other than the two-cylinder engine.

The present invention is not limited to the configurations described in the above embodiment, and can include various modification examples conceivable by a person skilled in the art without departing from the features recited in the following claims.

The present invention provides a motorcycle configured to improve dischargeability of hot air to outside the vehicle and is thus highly industrially applicable.

What is claimed is:

1. A motorcycle comprising:
an engine;
a radiator configured to cool cooling water for the engine;
a radiator fan configured to suck and discharge air ahead of the radiator;
a fan cover guiding downward the air discharged from the radiator fan; and
a side cowl disposed on a side of the radiator,
wherein the side cowl has a cover side lower end at a lower end of a portion positioned below a portion overlapped with the fan cover in a side view, the cover side lower end being positioned adjacent to a lower end of the fan cover, and the fan cover guides hot air from the radiator outward in a vehicle width direction, and
wherein the fan cover has an overall triangular shape and defines a flow channel configured to downwardly guide hot wind from the radiator fan, the flow channel having a sectional area expanding in the vehicle width direction toward a lower end thereof.

2. The motorcycle according to claim 1, wherein the fan cover has an outer side surface in the vehicle width direction positioned outside in the vehicle width direction with respect to the outer side surface of the engine in the vehicle width direction.

3. The motorcycle according to claim 1, further comprising an exhaust pipe connected to an exhaust port of the engine, the exhaust pipe extending forward from the exhaust port, and turning backward at a front end, wherein the side cowl is disposed with a vertical gap from at least part of the exhaust pipe.

4. The motorcycle according to claim 3, wherein:
the cover side lower end has a rear end edge slanting upward toward a rear end thereof;
the side cowl has a lower end positioned above the front end of the exhaust pipe; and
the exhaust pipe extends forward from the exhaust port along the rear end edge to reach the front end.

5. The motorcycle according to claim 3, wherein the exhaust pipe partially protrudes outward in a vehicle width direction from an extension plane anteroposteriorly extending from an anteroposterior end of the side cowl.

6. The motorcycle according to claim 1, wherein the side cowl and the exhaust port of the engine form an open space that is open to both sides in a vehicle width direction.

7. The motorcycle according to claim 6, further comprising an engine cover provided below the open space and covering the engine.

8. The motorcycle according to claim 1, wherein the motorcycle has an opening allowing communication between a space behind the radiator and an outer space in the vehicle width direction of the motorcycle.

* * * * *